United States Patent
Kellum et al.

(10) Patent No.: US 10,287,478 B2
(45) Date of Patent: May 14, 2019

(54) HYDRAZIDE-BASED CURING AGENTS FOR USE IN SUBTERRANEAN OPERATIONS

(71) Applicant: Halliburton Energy Services, Inc., Houston, TX (US)

(72) Inventors: Matthew Grady Kellum, Spring, TX (US); Gregory Robert Hundt, The Woodlands, TN (US); Paul Joseph Jones, Humble, TX (US); Jeffery Dwane Karcher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 15/535,805

(22) PCT Filed: Jan. 16, 2015

(86) PCT No.: PCT/US2015/011674
§ 371 (c)(1),
(2) Date: Jun. 14, 2017

(87) PCT Pub. No.: WO2016/114786
PCT Pub. Date: Jul. 21, 2016

(65) Prior Publication Data
US 2017/0349804 A1    Dec. 7, 2017

(51) Int. Cl.
*C09K 8/44* (2006.01)
*C04B 24/12* (2006.01)
(Continued)

(52) U.S. Cl.
CPC ............. *C09K 8/44* (2013.01); *C04B 24/12* (2013.01); *C04B 26/14* (2013.01); *C04B 28/02* (2013.01); *E21B 33/13* (2013.01)

(58) Field of Classification Search
CPC ........... E21B 33/13; C09K 8/44; C04B 24/12; C04B 26/14
See application file for complete search history.

(56) References Cited

U.S. PATENT DOCUMENTS 2,847,395 A    8/1958   Wear
3,294,748 A *  12/1966  Rogers, Jr. ......... C08G 59/4021
                                                       525/524

(Continued)

FOREIGN PATENT DOCUMENTS

WO    2013042614 A1    3/2013

OTHER PUBLICATIONS

International Search Report and Written Opinion issued in related PCT Application No. PCT/US2015/011674 dated Oct. 12, 2015, 11 pages.

(Continued)

*Primary Examiner* — Zakiya W Bates
*Assistant Examiner* — Crystal J Miller
(74) *Attorney, Agent, or Firm* — Thomas Rooney; Baker Botts L.L.P.

(57) ABSTRACT

Curable resin compositions comprising an epoxy resin and a hydrazide curing agent and methods for using the curable resin compositions in cementing and/or remedial operations in a subterranean formation are provided. In one embodiment, the method may comprise combining an epoxy resin and a curing agent to form a curable resin composition, wherein the curing agent comprises a hydrazide curing agent; introducing the curable resin composition into a subterranean formation; and allowing the curable resin composition to at least partially cure.

18 Claims, 5 Drawing Sheets

(51) Int. Cl.
*C04B 26/14* (2006.01)
*E21B 33/13* (2006.01)
*C04B 28/02* (2006.01)

(56) References Cited

U.S. PATENT DOCUMENTS

| | | | |
|---|---|---|---|
| 4,268,656 A | 5/1981 | Ray-Chaudhuri et al. | |
| 4,410,457 A * | 10/1983 | Fujimura | H01B 1/22 |
| | | | 252/508 |
| 4,489,785 A * | 12/1984 | Cole | C09K 8/502 |
| | | | 166/295 |
| 4,921,047 A | 5/1990 | Summers et al. | |
| 4,972,906 A * | 11/1990 | McDaniel | C09K 8/5086 |
| | | | 166/276 |
| 4,977,214 A * | 12/1990 | Bagga | C08G 59/56 |
| | | | 525/109 |
| 5,911,282 A | 6/1999 | Onan et al. | |
| 5,969,006 A | 10/1999 | Onan et al. | |
| 6,059,035 A | 5/2000 | Chatterji et al. | |
| 6,060,539 A * | 5/2000 | Hermansen | C08G 59/184 |
| | | | 523/400 |
| 6,068,055 A | 5/2000 | Chatterji et al. | |
| 6,387,310 B1 * | 5/2002 | Iizuka | C04B 41/009 |
| | | | 264/228 |
| 6,555,507 B2 | 4/2003 | Chatterji et al. | |
| 6,668,929 B2 | 12/2003 | Griffith et al. | |
| 6,723,803 B1 * | 4/2004 | Hermansen | C08G 59/20 |
| | | | 525/113 |
| 2003/0125471 A1 * | 7/2003 | Ishihara | C08F 290/067 |
| | | | 525/326.8 |
| 2007/0096056 A1 * | 5/2007 | Takeuchi | C08F 283/10 |
| | | | 252/299.01 |
| 2008/0305707 A1 * | 12/2008 | Imaizumi | C08F 290/06 |
| | | | 445/25 |
| 2010/0186956 A1 | 7/2010 | Morgan et al. | |
| 2013/0061925 A1 | 3/2013 | Satake et al. | |
| 2013/0203637 A1 * | 8/2013 | Gupta | C09K 8/685 |
| | | | 507/211 |
| 2014/0190697 A1 * | 7/2014 | Tang | C09K 8/565 |
| | | | 166/295 |

OTHER PUBLICATIONS

Kaman, Takashi, and Hitoshi Furukawa. "Curing mechanisms and mechanical properties of cured epoxy resins." Epoxy Resins and composites IV. Springer Berlin Heidelberg, 1986. 173-202.

Tomuta, Adrian M., et al. "The use of dihydrazides as latent curing agents in diglycidyl ether of bisphenol A coatings." Progress in Organic Coatings 74.1 (2012): 59-66.

International Preliminary Report on Patentability issued in related Application No. PCT/US2015/011674, dated Jul. 27, 2017 (8 pages).

Office Action issued in related AU Application No. 2015377198, dated Aug. 21, 2017 (6 pages).

* cited by examiner

HYDRAZIDE-BASED CURING AGENTS FOR USE IN SUBTERRANEAN OPERATIONS

CROSS-REFERENCE TO RELATED APPLICATION

The present application is a U.S. National Stage Application of International Application No. PCT/US2015/011674 filed Jan. 16, 2015, which is incorporated herein by reference in its entirety for all purposes.

BACKGROUND

The present disclosure relates to methods and compositions for use in cementing operations and/or remedial operations in previously-cemented areas in a subterranean formation.

Natural resources such as gas, oil, and water residing in a subterranean formation are usually recovered by drilling a wellbore down into the subterranean formation while circulating a drilling fluid in the wellbore. After terminating the circulation of the drilling fluid, a string of pipe, e.g., casing or liners, is run in the wellbore and cemented into place. Such cementing operations are commonly referred to as primary cementing operations.

In primary cementing operations, a hydraulic cement composition is pumped into the annular space between the walls of the wellbore and the exterior of the pipe string disposed therein. The cement composition is permitted to set in the annular space thereby forming an annular sheath of hardened, substantially impermeable cement therein. The cement sheath physically supports and positions the pipe string in the wellbore and bonds the exterior surfaces of the pipe string to the walls of the wellbore whereby the undesirable migration of fluids between zones or formations penetrated by the wellbore is prevented.

Shear and compressional stresses are commonly exerted on the cement as the result of relatively high fluid pressures and/or temperatures inside the pipe string during testing, hydraulic fracturing, perforating, fluid injection and/or fluid production and as the result of outside forces exerted on the cement sheath due to formation shifting, overburdened pressures, subsidence, and/or tectonic creep. Resins (e.g., epoxy resins) can be used in cement compositions to improve the resiliency, i.e., elasticity and ductility, of the cement sheath to withstand these commonly exerted stresses.

Small openings such as holes or cracks in the casing string, the cement sheath, and/or the wellbore are sometimes formed as a result of these stresses through which fluids can undesirably flow into or out of the wellbore. Due to their resiliency, epoxy resins can also be used to seal the small openings and serve as a barricade against leaks of undesirable fluids. Such sealing operations are commonly referred to as remedial operations.

BRIEF DESCRIPTION OF THE DRAWINGS

These drawings illustrate certain aspects of some of the embodiments of the present disclosure, and should not be used to limit or define the claims.

Figure 1:
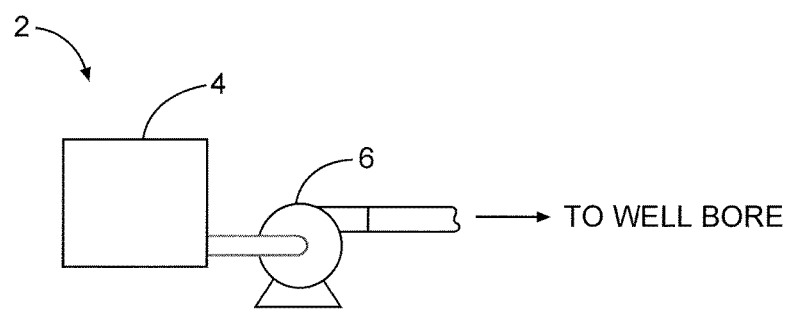
FIG. 1 illustrates a system for preparation and delivery of a cement composition comprising a curable resin composition of the present disclosure to a wellbore in accordance with aspects of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and compositions for use in cementing operations and/or remedial operations in previously-cemented areas in a subterranean formation. More particularly, the present disclosure relates to curable resin compositions comprising an epoxy resin and a hydrazide curing agent and methods for using the curable resin compositions in cementing operations and/or remedial operations in previously-cemented areas in a subterranean formation.

Generally, curing agents dissolve into and chemically react with liquid epoxy resins to at least partially cure the epoxy resin into a solid over time. Amine curing agents are commonly used curing agents. The active hydrogen atoms of the amine group(s) of an amine curing agent react with the epoxy group(s) of an epoxy resin to yield cured epoxy resins that have excellent heat and chemical resistance. Traditional amine curing agents may begin to react with epoxy resins upon mixing at room temperature because, among other reasons, they are liquids or they dissolve easily into the epoxy resin. As used herein, the term "room temperature" refers to a temperature of from about 15° C. to about 28° C. Thus, the epoxy resins often must be placed in the desired location in a subterranean formation quickly after mixing to prevent the epoxy resin from curing in the mixing equipment or prior to reaching the desired location within a wellbore.

Without limiting the disclosure to any particular theory or mechanism, it is believed that the hydrazide curing agents of the present disclosure may be partially or substantially insoluble in epoxy resins at room temperature. It is further believe that the hydrazide curing agents of the present disclosure may be substantially unreactive with the epoxy resins until the hydrazide curing agents reach their activation temperature. As used herein, the term "activation temperature" refers to the temperature at which the curing agent begins to substantially react with the epoxy resin. As used herein, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more. Thus, the curable resin compositions of the present disclosure may exhibit delayed curing as compared to other curing agents. The delayed curing of the hydrazide curing agents of the present disclosure as compared to aromatic diamine curing agents, in particular, was unexpected (without the benefit of this disclosure) based on chemical structure and electron density at least in part because aliphatic diamines generally would be expected to react faster with epoxy resins than aromatic diamines due to the delocalized electron density of the aromatic diamines.

Among the many potential advantages of the methods and compositions of the present disclosure, only some of which are alluded to herein, the compositions of the present disclosure may allow for delayed curing of the curable resin compositions such that the curable resin compositions remain in a form that is pumpable for an extended time after combining the epoxy resin and the curing agent. Thus, the delayed curing of the curable resin compositions allows for greater time to place the curable resin compositions in a specific desired location within a wellbore before curing occurs. The compositions of the present disclosure may also be pre-mixed and stored at ambient temperatures without substantially curing. When pre-mixed, the compositions of the present disclosure may be pumped directly into a wellbore, thereby eliminating the need for equipment at the production well site to combine the epoxy resin and the curing agent.

The present disclosure provides curable resin compositions comprising an epoxy resin and a curing agent. The curable resin compositions of the present disclosure may optionally further comprise a diluent, filler particles, a silane coupling agent, and/or combinations thereof. The present disclosure also provides methods of using the curable resin compositions in both primary cementing and remedial operations in a previously-cemented area in a subterranean formation. As used herein, the term "primary cementing operations" refers to operations that employ cementing fluids to achieve zonal isolation and to support, position, and/or bond a string of pipe in a wellbore in a subterranean formation. "Remedial operations" may include operations that are used to cure a variety of well problems that may occur at any time during the life of the well, including, but not limited to, well construction, well repair, well stimulation, production, and abandonment.

In the certain embodiments of the present disclosure, a curable resin composition may be formed by combining (e.g., mixing) an epoxy resin and a curing agent. In certain embodiments, the epoxy resin may be liquid. In certain embodiments, two or more epoxy resins may be combined and used as the epoxy resin in accordance with the methods and compositions of the present disclosure. The epoxy resins that may be suitable for use in accordance with the present disclosure include, but are not limited to, bisphenol A diglycidyl ether resins, bisphenol F diglycidyl ether resins, bisphenol AF diglycidyl ether resins, bisphenol S diglycidyl ether resins, novolac epoxy resins, cyclohexanedimethanol diglycidyl ether, tetraphenylolethane glycidyl ether, poly(ethylene glycol) diglycidyl ether, poly(propyleneglycol) diglycidyl ether, hexanediol diglycidyl ether, epoxy cresol novolacs, butanediol diglycidyl ether, N,N-diglycidyl-4-glycidyloxyaniline, resorcinol diglycidyl ether, tris(4-hydroxyphenyl) methane triglycidyl ether, and tetraglycidyl-4,4'-methylenedianiline, neopentyl glycol diglycidyl ether, and combinations thereof. One example of a commercially available epoxy resin is Araldite® GY-506, available from Huntsman Corporation, Houston, Tex.

In certain embodiments, one or more curing agents may be combined with the epoxy resin to form a curable resin composition. In certain embodiments, the curing agent and epoxy resin may be combined in amounts to provide an equimolar ratio of epoxide groups in the epoxy resin to amino-hydrogens in the curing agent. In certain embodiments, the curing agent may be present in the curable resin composition in an amount from about 1% to about 150% by weight of epoxy resin. In some embodiments, the curing agent may be present in the curable resin composition in an amount from about 1% to about 50% by weight of epoxy resin. In other embodiments, the curing agent may be present in the curable resin composition in an amount from about 20% to about 40% by weight of epoxy resin. In certain embodiments, the curing agent may be present in the curable resin composition in an amount from about 20% to about 25% by weight of epoxy resin, in other embodiments, from about 25% to about 30% by weight of epoxy resin, in other embodiments, from about 30% to about 35% by weight of epoxy resin, in other embodiments, from about 35% to about 40% by weight of epoxy resin.

The curing agent may comprise a hydrazide curing agent. In certain embodiments, two or more hydrazide curing agents may be combined and used as the hydrazide curing agent in accordance with the methods and compositions of the present disclosure. The hydrazide curing agents that may be suitable for use in accordance with the present disclosure may be any hydrazide that is solid and that is partially or substantially insoluble in the epoxy resin at room temperature such that the curable resin composition does not begin to cure. Suitable hydrazide curing agents that may be used in accordance with the present disclosure include, but are not limited to, adipic acid dihydrazide, 3,4-diaminobenzhydrazide, succinic dihydrazide, 4-aminobenzoic hydrazide, (+)-biotinamidohexanoic acid hydrazide, oxalyldihydrazide, maleic hydrazide, dodecanoic acid dihydrazide, isophthalic acid dihydrazide, 1,4-cyclohexyl dihydrazide, 4,4'-(propane-1,3-diylbisoxy) dibenzoic dihydrazide, terephthalic acid dihydrazide, isophthalic dihydrazide, and combinations thereof.

In certain embodiments, the hydrazide curing agent may be an aromatic hydrazide. In certain embodiments, the hydrazide curing agent may be a linear and/or branched aliphatic hydrazide. In certain embodiments, the hydrazide curing agent may be a dihydrazide having the following chemical structure:

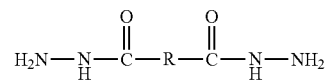

wherein R may comprise $(-CH_2-)_n$ or $(-Ar-)$, wherein n may be a number from 0 to 10, and wherein Ar is an aromatic ring. Examples of commercially available hydrazide curing agents are adipic acid dihydrazide (ADH) and isophthalic dihydrazide (IDH), available from Brenntag Specialties, Inc., South Plainfield, N.J.

In certain embodiments, the curing agent may further comprise an amine curing agent. The amine curing agents that may be suitable for use in accordance with the present disclosure may include, but are not limited to, aliphatic amines and aromatic amines. Examples of commercially available amine curing agents are diethyltoluenediamine and Jeffamine® D230, available form Huntsman Corporation, Houston, Tex., and Ethacure® 300, available form Albemarle Corp., Baton Rouge, La. In such embodiments, the amine curing agent may comprise up to about 50% of the total curing agent that may be used to form the curable resin composition.

In certain embodiments, the curing agent may further comprise an anhydride curing agent. The anhydride curing agents that may be suitable for use in accordance with the present disclosure may include, but are not limited to, methyltetrahydrophthalic anhydride, tetrahydrophthalic anhydride, methylhexahydrophthalic anhydride, hexahydrophthalic anhydride, maleic anhydride, phthalic anhydride, and combinations thereof. Examples of commercially available anhydrides are the Lindride® family of anhydride curing agents available from Lindau Chemicals, Inc., Columbia, S.C. In such embodiments, the anhydride curing agent may comprise up to about 50% of the total curing agent that may be used for form the curable resin composition.

In certain embodiments, the curing agent may react with the epoxy resin and may thus cause the curable resin composition to cure (e.g., harden). In certain embodiments, the curing agent may be partially or substantially insoluble in and substantially unreactive with the epoxy resin at room temperature and thus may not cure at room temperature. In some embodiments, the curing agent may remain partially or substantially insoluble in and substantially unreactive with the epoxy resin until the temperature of the curable resin composition reaches the activation temperature of the curing agent and thus may not substantially cure until the activation temperature is reached. In certain embodiments, the activation temperature of the curing agent may vary depending on, among other factors, the type of curing agent and the type of epoxy resin used to form the curable resin composition. In certain embodiments, the rate at which the curable resin composition cures may vary depending on temperature, the type of curing agent used, the type of epoxy resin used, and/or other factors. For example, in certain embodiments, a curable resin composition comprising a hydrazide curing agent may cure more rapidly over a narrower temperature range as compared to a curable resin composition comprising an amine curing agent.

In certain embodiments, the activation temperature of the hydrazide curing agent may be above room temperature. In certain embodiments, the activation temperature of the hydrazide curing agent may be above about 100° C. In certain embodiments, the activation temperature of the hydrazide curing agent may be a temperature from about 100° C. to about 260° C. In certain embodiments, the activation temperature of the hydrazide curing agent may be a temperature from about 100° C. to about 120° C., in other embodiments, from about 120° C. to about 140° C., in other embodiments, from about 140° C. to about 160° C., in other embodiments, from about 160° C. to about 180° C., in other embodiments, from about 180° C. to about 200° C., in other embodiments, from about 200° C. to about 220° C., in other embodiments, from about 220° C. to about 240° C., and in other embodiments, from about 240° C. to about 260° C.

In certain embodiments, the curable resin composition may contain two or more curing agents. In such embodiments, the curing agents may have different activation temperatures, and thus the curable resin composition may cure in multiple stages as the temperature of the curable resin composition increases. For example, in certain embodiments, the curable resin composition may contain a hydrazide curing agent and an amine curing agent. In such embodiments, the amine curing agent may have a lower activation temperature than the hydrazide curing agent, and thus the curable resin composition may cure in multiple stages. In certain embodiments, the curable resin composition may begin to partially cure at the activation temperature of the amine curing agent and may thus increase the viscosity of the curable resin composition. In certain embodiments, the curable resin composition may further cure at temperatures above the activation temperature of the hydrazide curing agent. In certain embodiments, the multi-stage curing of the curable resin composition may allow for solids (e.g., filler particles) to be suspended in the curable resin composition while preventing full curing of the curable resin composition before the curable resin composition is placed in a desired location within the wellbore.

In certain embodiments, the curable resin compositions of the present disclosure optionally may comprise any number of additional additives. Examples of such additional additives include, but are not limited to, diluents, filler particles, silane coupling agents, and combinations thereof. In certain embodiments, the curable resin composition may comprise a diluent, filler particles, and/or a silane agent.

The diluents that may be suitable for use in accordance with the present disclosure may be any solvent or reactive diluent that modifies the viscosity of the curable resin composition. In certain embodiments of the present disclosure, the viscosity of the curable resin composition may less than about 3000 centipoise (cP) at room temperature. In certain embodiments, the viscosity of the curable resin composition may be about 500 cP at room temperature. Suitable solvents that may be used as diluents in accordance with the present disclosure include, but are not limited to, polyethylene glycol, butyl lactate, dipropylene glycol methyl ether, dipropylene glycol dimethyl ether, dimethyl folinamide, diethylene glycol methyl ether, ethyleneglycol butyl ether, diethyleneglycol butyl ether, propylene carbonate, d-limonene, fatty acid methyl esters, xylenes, solvent naphthas, and combinations thereof. Suitable reactive diluents that may be used in accordance with the present disclosure include, but are not limited to, butyl glycidyl ether, ethylhexyl glycidyl ether, $C_{12}$-$C_{14}$ alcohol glycidyl ether, cresol glycidyl ether, tert-butyl glycidyl ether, tert-butyl phenol glycidyl ether, cashew nut shell liquid glycidyl ether, and combinations thereof.

In certain embodiments, a diluent may be present in the curable resin composition in an amount from about 0.1% to about 50% by weight of epoxy resin. In certain embodiments, the diluent may be present in the curable resin composition in an amount from about 1% to about 10% by weight of epoxy resin. In certain embodiments, the diluent may be present in the curable resin composition in amount from about 1% to about 2% by weight of epoxy resin, in other embodiments, from about 2% to about 3% by weight of epoxy resin, in other embodiments, from about 3% to about 4% by weight of epoxy resin, in other embodiments, from about 4% to about 5% by weight of epoxy resin, in other embodiments, from about 5% to about 6% by weight of epoxy resin, in other embodiments, from about 6% to about 7% by weight of epoxy resin, in other embodiments, from about 7% to about 8% by weight of epoxy resin, in other embodiments, from about 8% to about 9% by weight of epoxy resin, and in other embodiments, from about 9% to about 10% by weight of epoxy resin.

The filler particles that may be suitable for use in accordance with the present disclosure may be any filler particles that adjust the density of the curable resin composition, that increase the compressive strength of the curable resin composition, and/or that reduce the cost of the curable resin composition. Suitable filler particles that may be used in accordance with the present disclosure include, but are not limited to, aluminum oxide, awaruite, barium carbonate, barium oxide, barite, calcium carbonate, calcium oxide, chromite, chromium oxide, copper, copper oxide, dolomite, galena, gold, hematite, a hollow glass microsphere, ilmenite, iron oxide, kaolinite, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, and combinations thereof.

In certain embodiments, filler particles may be present in the curable resin composition in an amount from about 0.1% to about 90% by weight of epoxy resin. In certain embodiments, filler particles may be present in the curable resin composition in an amount from about 1% to about 30% by weight of epoxy resin. In certain embodiments, filler particles may be present in the curable resin composition in an amount from about 1% to about 10% by weight of epoxy resin, in other embodiments, from about 5% to about 10% by weight of epoxy resin, in other embodiments, from about 10% to about 15% by weight of epoxy resin, in other embodiments, from about 15% to about 20% by weight of epoxy resin, in other embodiments, from about 20% to about 25% by weight of epoxy resin, and in other embodiments, from about 25% to about 30% by weight of epoxy resin.

The silane coupling agents that may be suitable for use in accordance with the present disclosure may be any silane coupling agent that may increase the bonding between the curable resin composition and the surfaces to which the curable resin composition may be bonded (e.g., casing string and subterranean formation). Suitable silane coupling agents that may be used in accordance with the present disclosure include, but are not limited to, N-2-(aminoyl)-3-aminopropyl triethoxy silane, 3-glycidyloxypropyltrimethoxysilane, 3-aminopropyltrimethoxy silane, and combinations thereof.

In certain embodiments, a silane coupling agent may be present in the curable resin composition in an amount from about 0.1% to about 20% by weight of epoxy resin. In certain embodiments, the silane coupling agent may be present in the curable resin composition in an amount from about 0.1% to about 5% by weight of epoxy resin, in other embodiments, from about 5% to about 10% by weight of epoxy resin, in other embodiments, from about 10% to about 15% by weight of epoxy resin, and in other embodiments, from about 15% to about 20% by weight of epoxy resin.

In certain embodiments, the curable resin compositions of the present disclosure may be introduced into a subterranean formation. In certain embodiments, the curable resin compositions may be introduced into the subterranean formation using one or more pumps. In certain embodiments, the epoxy resin and the curing agent may be combined at a production well site to form the curable resin composition before the curable resin composition may be introduced into the subterranean formation. In such embodiments, the total placement time of the curable resin composition in the subterranean formation may be greater than three hours. As used herein, the term "total placement time" refers to the amount of time available to place the curable resin composition in a desired location of a wellbore in a subterranean formation after combining the epoxy resin and the curing agent and before the curable resin composition becomes too hard to practically pump into the wellbore.

In other embodiments, the epoxy resin and the curing agent may be combined at an off-site location to form the curable resin composition. As used herein, the term "off-site location" refers to any location other than the production well site. In such embodiments, the curable resin composition may be later transported to the production well site as may be needed. In certain embodiments, the curable resin compositions of the present disclosure may be stored at a temperature below the activation temperature without curing. In some embodiments, the curable resin compositions of the present disclosure may be stored for several weeks below the activation temperature without curing.

In certain embodiments, the curable resin compositions of the present disclosure may be allowed to cure after being placed in a subterranean formation. In some embodiments, the temperature of the subterranean formation may be above the activation temperature, and thus the curable resin composition may cure in the subterranean formation under the ambient conditions of the formation. In other embodiments, the temperature of the subterranean formation may be below the activation temperature. In such embodiments, the temperature of the curable resin composition may be increased to above the activation temperature after the curable resin composition has been placed in a desired location in the subterranean formation, and thus the curable resin composition may then cure in the subterranean formation. In such embodiments, the temperature of the curable resin composition may be increased by introducing steam into the subterranean formation and/or circulating hot oil or diesel between tubing and the casing string.

In certain embodiments, a liquid epoxy resin and a curing agent comprising a solid hydrazide curing agent may be combined to form a curable resin composition. In some embodiments, the curable resin composition may further comprise one or more diluents, filler particles, silane coupling agents, and/or combinations thereof. In certain embodiments, the hydrazide curing agent may be unreactive with the liquid epoxy resin until the temperature of the curable resin composition reaches the activation temperature.

In some embodiments, the curable resin compositions of the present disclosure may be used in remedial operations to seal perforations within a subterranean formation through which fluids can undesirably flow. In such embodiments, the curable resin compositions may be introduced into a perforation within a subterranean formation to serve as a barricade against leaks of undesirable fluids into and out of the wellbore. In certain embodiments, the perforation may be located in various locations within a subterranean formation including, but not limited to, the wellbore casing string, the cement sheath, and the formation. In certain embodiments, the curable resin compositions may be introduced into an annular gas channel to mitigate gas migration. In certain embodiments, the temperature of the subterranean formation may be above the activation temperature of the curing agent, and the curable resin composition may be allowed to cure in the subterranean formation to seal the perforation.

In other embodiments, the curable resin compositions of the present disclosure may be used in primary cementing operations to improve the resiliency (i.e., elasticity and ductility) of the cement sheath. In such embodiments, the curable resin composition may be combined with a cement slurry before being introduced into a subterranean formation to form a cement composition. As used herein, the term "cement slurry" refers to a mixture comprising cement and water in a form that can be pumped into a subterranean formation and allowed to set or harden.

The curable resin compositions disclosed herein may directly or indirectly affect one or more components or pieces of equipment associated with the preparation, delivery, recapture, recycling, reuse, and/or disposal of the disclosed cement compositions. For example, the disclosed curable resin compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the disclosed cement compositions. The disclosed curable resin compositions may also directly or indirectly affect any transport or delivery equipment used to convey the disclosed cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed curable resin compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition comprising a curable resin composition of the present disclosure in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the curable resin composition may be pumped from a storage vessel into the mixing equipment 4. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 2A:
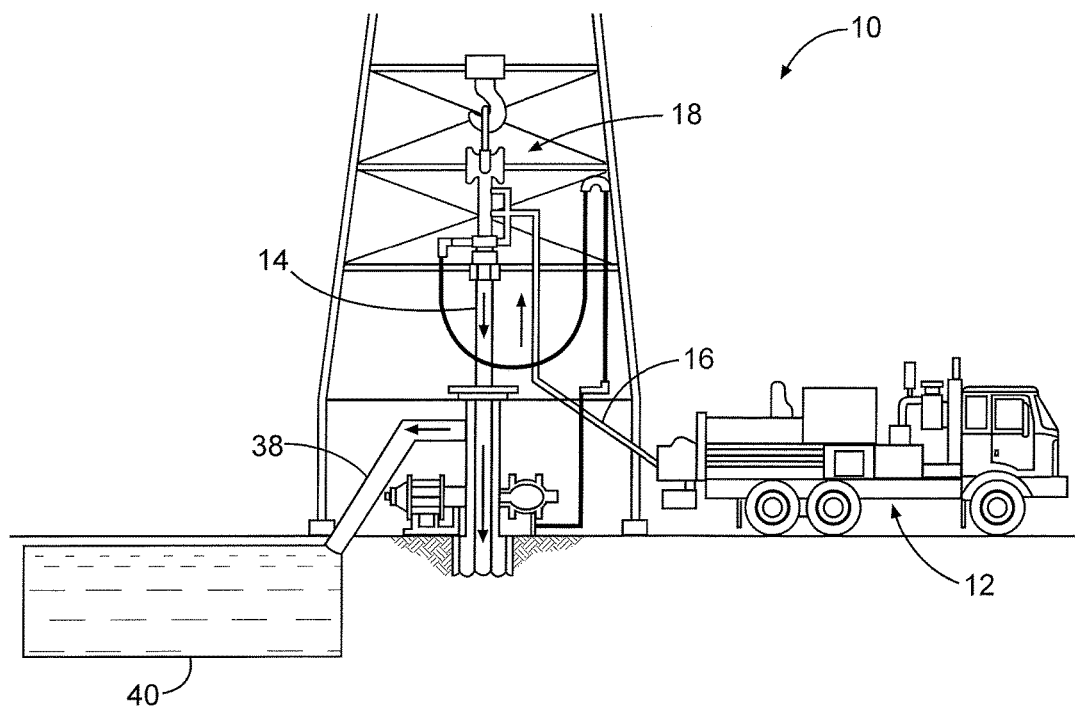
FIG. 2A illustrates surface equipment that may be used in placement of a cement composition comprising a curable resin composition of the present disclosure in a wellbore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 comprising a curable resin composition of the present disclosure through a feed pipe 16 and to a cementing head 18 which conveys the cement composition 14 downhole.

Figure 2B:
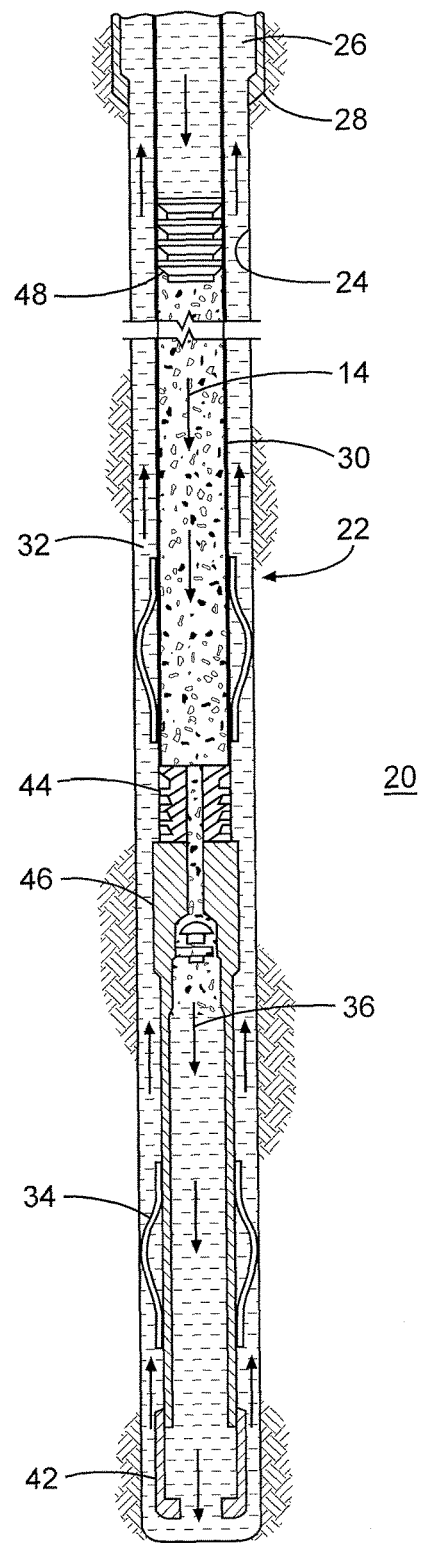
FIG. 2B illustrates placement of a cement composition comprising a curable resin composition of the present disclosure into a wellbore annulus in accordance with aspects of the present disclosure.

Turning now to FIG. 2B, the cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiments, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.) shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath 28 that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30 or the cement composition 14 may be introduced into an open hole section of the wellbore 22 before the casing 30 is disposed in the wellbore 22.

As it is introduced, the cement composition 14 may displace other fluids 36, such as drilling fluids and/or spacer fluids, that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

An embodiment of the present disclosure is a method comprising: combining an epoxy resin and a curing agent to form a curable resin composition, wherein the curing agent comprises a hydrazide curing agent; introducing the curable resin composition into a subterranean formation; and allowing the curable resin composition to at least partially cure.

Another embodiment of the present disclosure is a method comprising: combining an epoxy resin and a curing agent to form a curable resin composition, wherein the curing agent comprises a dihydrazide having the following chemical structure

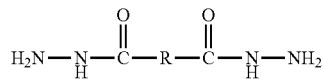

wherein R comprises $(-CH_2-)_n$ or $(-Ar-)$; wherein n is a number from 0 to 10; and wherein Ar is an aromatic ring; introducing the curable resin composition into a subterranean formation; and allowing the curable resin composition to at least partially cure.

Another embodiment of the present disclosure is a composition comprising: an epoxy resin; a curing agent, wherein the curing agent comprises a hydrazide curing agent; and at least one of a diluent, a plurality of filler particles, and a silane coupling agent.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Three different curable resin compositions were obtained by mixing an epoxy resin, Araldite® GY-506, with three different curing agents, two aromatic amine curing agents and one dihydrazide curing agent, at room temperature. The epoxy resin was mixed with each curing agent in amounts to provide an equimolar ratio of epoxide groups in the epoxy resin to amino-hydrogens in the curing agent.

Example 1

The thickening times of the three curable resin compositions were measured at a temperature of about 120° C. and pressure of about 3000 psi. The temperature and pressure of the curable resin compositions were steadily increased from ambient temperature to about 120° C. and from ambient pressure to 3000 psi over 45 minutes. As shown in Table 1, the curable resin composition comprising the hydrazide curing agent, adipic acid dihydrazide, in accordance with the present disclosure had a longer thickening time than the aromatic amine curing agent, diethyltoluenediamine. Example 1 demonstrates that the hydrazide curing agents of the present disclosure may provide extended total placement time of curable resin composition in the subterranean formation as compared to some aromatic amine curing agents.

Example 2

The hard set time of the three curable resin compositions was measured at about 85° C. by determining the time required for a cylinder of each curable resin composition to cure enough to hold its shape when removed from the cylindrical mold. As shown in Table 1, both of the aromatic amine curing agents, diethyltoluenediamine and Ethacure® 300, cured faster than the hydrazide curing agent, adipic acid dihydrazide, at the lower temperature as compared to the temperature used in Example 1. There was no noticeable increase in the viscosity of the curable resin composition with the hydrazide curing agent after 7 days. A comparison of the results from Example 1 and Example 2 demonstrates that the hydrazide curing agents of the present disclosure may be unreactive with epoxy resin until the activation temperature is reached, and thus that the use of the hydrazide curing agent may provide the ability to form and store the curable resin compositions of the present disclosure at temperatures below the activation temperature without the curable resin composition substantially curing.

Example 2 also demonstrates that the hydrazide curing agents of the present disclosure may not react with epoxy resin at temperatures at which aromatic amine curing agents react with epoxy resin. This delayed curing of the hydrazide curing agent as compared to the aromatic amine curing agents is unexpected based on the chemical structure and electron densities of the curing agents. Based on solely on chemical structure, it could be reasonably assumed that the terminal amines in the hydrazide curing agent would react more quickly than the terminal amines in the aromatic amine curing agents. Additionally, aliphatic diamines, such as adipic acid dihydrazide, will generally react faster with epoxy resins than aromatic diamines due to delocalization of electron density in aromatic diamines, which reduces the nucleophilicity of the lone pairs of electrons in the aromatic diamines. However, as Example 2 demonstrates, the hydrazide curing agent may not react with the epoxy resin until the activation temperature is reached, and thus may be less reactive with epoxy resin as compared to other amine curing agents at temperatures below the activation temperature.

TABLE 1

| Epoxy Resin | Epoxy Resin (g) | Curing Agent | Curing Agent (g) | Thickening Time (hours) | Hard Set Time |
|---|---|---|---|---|---|
| Araldite ® GY-506 | 600 | Diethyltoluene-diamine | 162 | 1.97 | 9 hours |
| Araldite ® GY-506 | 600 | Adipic Acid Dihydrazide | 159 | 3.37 | >7 days |
| Araldite ® GY-506 | 600 | Ethacure ® 300 | 194 | 5.75 | 48 hours |

Example 3

Figure 3:
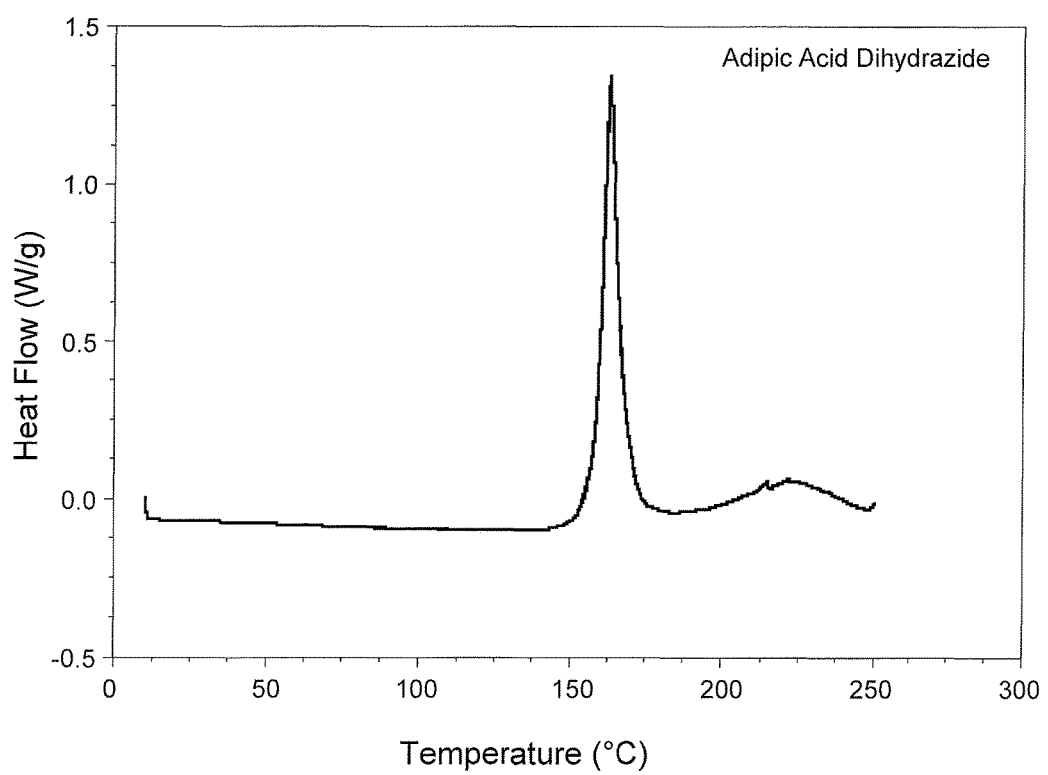
FIG. 3 is a differential scanning calorimetry thermogram depicting a curing exotherm for a curable resin composition comprising an epoxy resin and a hydrazide curing agent, according to one embodiment of the present disclosure.
Figure 4:
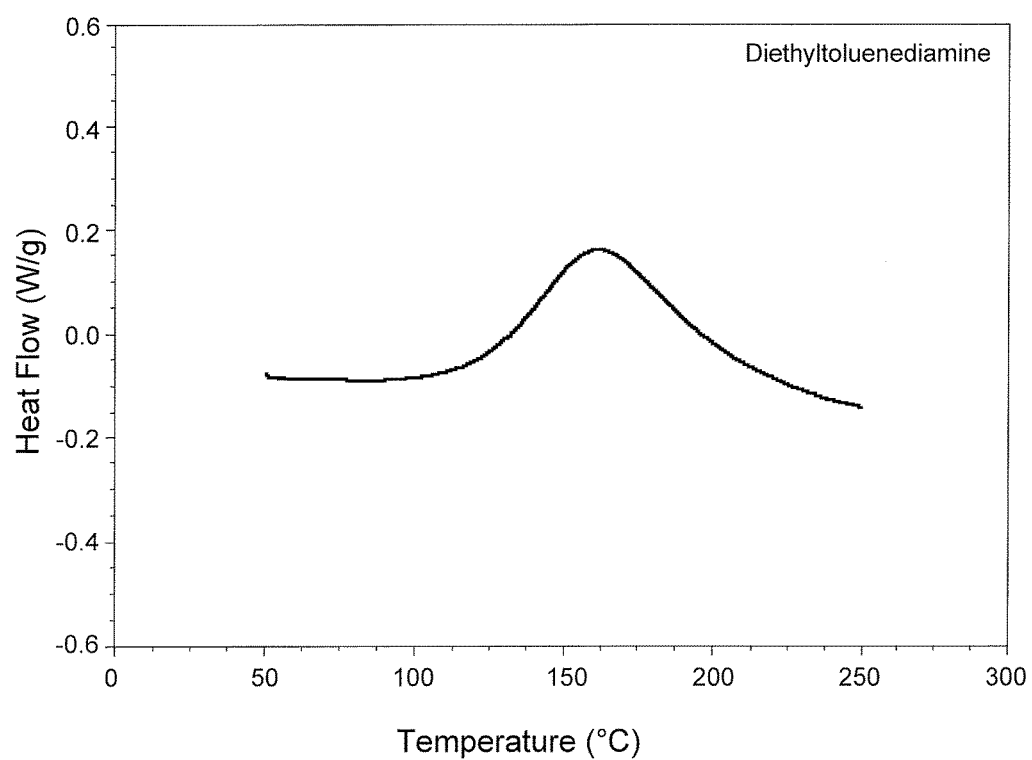
FIG. 4 is a differential scanning calorimetry thermogram depicting a curing exotherm for a curable resin composition comprising an epoxy resin and an aromatic amine curing agent, diethyltoluenediamine.
Figure 5:
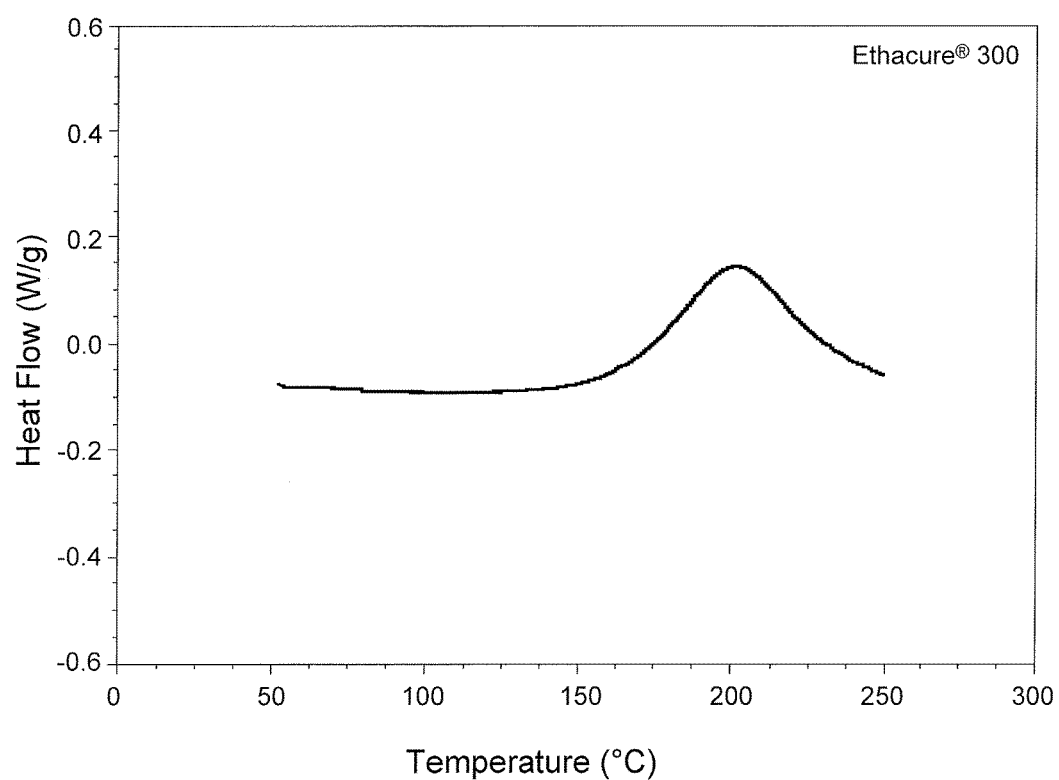
FIG. 5 is a differential scanning calorimetry thermogram depicting a curing exotherm for a curable resin composition comprising an epoxy resin and an aromatic amine curing agent, Ethacure® 300.

The three curable resin compositions were cured and tested in a differential scanning calorimeter to determine the activation temperature of the curing agents. The curable resin compositions were heated to 250° C. at 2.5° C. per minute and then held at 250° C. for 5 minutes to ensure the curable resin compositions were fully cured. FIG. 3 shows a differential scanning calorimetry thermogram depicting a curing exotherm for a curable resin composition comprising an epoxy resin and a hydrazide curing agent, according to one embodiment of the present disclosure. FIG. 4 shows a differential scanning calorimetry thermogram depicting a curing exotherm for a curable resin composition comprising an epoxy resin and an aromatic amine curing agent, diethyltoluenediamine. FIG. 5 shows a differential scanning calorimetry thermogram depicting a curing exotherm for a curable resin composition comprising an epoxy resin and an aromatic amine curing agent, Ethacure® 300.

As depicted in FIG. 3, the hydrazide curing agent, adipic acid dihydrazide, began to react with the epoxy resin upon reaching a activation temperature of about 150° C. As depicted in FIG. 4, the aromatic amine curing agent, diethyltoluenediamine, has a lower activation temperature of about 110° C. as compared to the activation temperature of the hydrazide curing agent depicted in FIG. 3. As depicted in FIG. 5, the aromatic amine curing agent, Ethacure® 300, has a lower activation temperature of about 125° C. as compared to the activation temperature of the hydrazide curing agent depicted in FIG. 3. Example 3 further demonstrates the delayed curing of the hydrazide curing agent as compared to the aromatic amine curing agents.

As shown in FIG. 3, the curable resin composition comprising the hydrazide curing agent rapidly cured over a narrow temperature range from about 150° C. to about 185° C. as depicted by the sharp and narrow curing exotherm. As shown FIG. 4 and FIG. 5, the curable resin compositions comprising the aromatic amine curing agents gradually cured over broader temperature ranges as depicted by the gradual and wider curing exotherms. Example 3 also demonstrates that type of curing agent used in the methods and compositions of the present disclosure may affect the rate at which the curable resin composition cures.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
combining an epoxy resin and a curing agent to form a curable resin composition, wherein the curing agent consists of a hydrazide curing agent, and wherein the curable resin composition comprises the curing agent in an amount from about 20% to about 40% by weight of the curable resin composition;
introducing the curable resin composition into an annulus formed between a casing string and a wellbore located within a subterranean formation or a perforation in a cement sheath or the casing string located within the subterranean formation; and
allowing the curable resin composition to at least partially cure within the annulus or the perforation.

2. The method of claim 1 wherein the hydrazide curing agent is a dihydrazide having the following chemical structure:

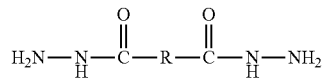

wherein R comprises $(-CH_2-)_n$ or $(-Ar-)$;
wherein n is a number from 0 to 10; and
wherein Ar is an aromatic ring.

3. The method of claim 1 wherein the hydrazide curing agent comprises at least one compound selected from the group consisting of: an aromatic hydrazide, an aliphatic hydrazide, and any combination thereof.

4. The method of claim 1 wherein the hydrazide curing agent is selected from the group consisting of: adipic acid dihydrazide, 3, 4-diaminobenzhydrazide, succinic dihydrazide, 4-aminobenzoic hydrazide, (+)-biotinamidohexanoic acid hydrazide, oxalyldihydrazide, maleic hydrazide, dodecanoic acid dihydrazide, isophthalic acid dihydrazide, 1,4-cyclohexyl dihydrazide, 4,4'-(propane-1,3-diylbisoxy) dibenzoic dihydrazide, terephthalic acid dihydrazide, isophthalic dihydrazide, and any combination thereof.

5. The method of claim 1 wherein the curable resin composition does not cure at room temperature.

6. The method of claim 1 further comprising adding at least one of a diluent, a filler particle, a silane coupling agent, or any combination thereof to the curable resin composition.

7. The method of claim 1 wherein combining the epoxy resin and the curing agent is performed at an off-site location.

8. The method of claim 1 wherein the subterranean formation has a temperature above the activation temperature of the hydrazide curing agent.

9. The method of claim 1 further comprising increasing the temperature of the subterranean formation to above the activation temperature of the hydrazide curing agent before allowing the curable resin composition to cure, wherein the subterranean formation has a temperature below the activation temperature of the hydrazide curing agent when the curable resin composition is introduced into the subterranean formation.

10. The method of claim 1 wherein the curable resin composition is introduced into the subterranean formation using one or more pumps.

11. The method of claim 1 further comprising combining the curable resin composition with a cement slurry before introducing the curable resin composition into a subterranean formation.

12. A method comprising:
combining an epoxy resin and a curing agent to form a curable resin composition, wherein the curable resin composition comprises the curing agent in an amount from about 20% to about 40% by weight of the curable resin composition, and wherein the curing agent consists of a dihydrazide having the following chemical structure:

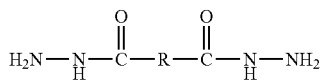

wherein R comprises (—CH$_2$—)$_n$ or (—Ar—);
wherein n is a number from 0 to 10; and
wherein Ar is an aromatic ring;
introducing the curable resin composition into a subterranean formation; and
allowing the curable resin composition to at least partially cure.

13. A curable resin composition comprising:
an epoxy resin;
a curing agent consisting of a hydrazide curing agent, wherein the curable resin composition comprises the curing agent in an amount from about 20% to about 40% by weight of the curable resin composition; and
a diluent in an amount from about 0.1% to about 50% by weight of the epoxy resin.

14. The curable resin composition of claim 13 wherein the epoxy resin is selected from the group consisting of: bisphenol A diglycidyl ether resins, bisphenol F diglycidyl ether resins, bisphenol AF diglycidyl ether resins, bisphenol S diglycidyl ether resins, novolac epoxy resins, cyclohexanedimethanol diglycidyl ether, tetraphenylolethane glycidyl ether, poly(ethylene glycol) diglycidyl ether, poly(propyleneglycol) diglycidyl ether, hexanediol diglycidyl ether, epoxy cresol novolacs, butanediol diglycidyl ether, N,N-diglycidyl-4-glycidyloxyaniline, resorcinol diglycidyl ether, tris(4-hydroxyphenyl) methane triglycidyl ether, and tetraglycidyl-4,4'-methylenedianiline, neopentyl glycol diglycidyl ether, and any combination thereof.

15. The curable resin composition of claim 13 wherein the hydrazide curing agent is selected from the group consisting of: adipic acid dihydrazide, 3, 4-diaminobenzhydrazide, succinic dihydrazide, 4-aminobenzoic hydrazide, (+)-biotinamidohexanoic acid hydrazide, oxalyldihydrazide, maleic hydrazide, dodecanoic acid dihydrazide, isophthalic acid dihydrazide, 1,4-cyclohexyl dihydrazide, 4,4'-(propane-1,3-diylbisoxy) dibenzoic dihydrazide, terephthalic acid dihydrazide, isophthalic dihydrazide, and any combination thereof.

16. The curable resin composition of claim 13 wherein the diluent is selected from the group consisting of: polyethylene glycol, butyl lactate, dipropylene glycol methyl ether, dipropylene glycol dimethyl ether, dimethyl formamide, diethylene glycol methyl ether, ethyleneglycol butyl ether, diethyleneglycol butyl ether, propylene carbonate, d-limonene, fatty acid methyl esters, xylenes, solvent naphthas, butyl glycidyl ether, ethylhexyl glycidyl ether, C$_{12}$-C$_{14}$ alcohol glycidyl ether, cresol glycidyl ether, tert-butyl glycidyl ether, tert-butyl phenol glycidyl ether, cashew nut shell liquid glycidyl ether, and any combination thereof.

17. The curable resin composition of claim 13 further comprising a plurality of filler particles selected from the group consisting of: aluminum oxide, awaruite, barium carbonate, barium oxide, barite, calcium carbonate, calcium oxide, chromite, chromium oxide, copper, copper oxide, dolomite, galena, gold, hematite, a hollow glass microsphere, ilmenite, iron oxide, kaolinite, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, an elastomer, sand, and any combination thereof.

18. The curable resin composition of claim 13 further comprising a silane coupling agent selected from the group consisting of: N-2-(aminoyl)-3-aminopropyl triethoxy silane, 3-glycidyloxypropyltrimethoxysilane, 3-aminopropyltrimethoxy silane, and any combination thereof.

* * * * *